United States Patent
Renwick et al.

(10) Patent No.: US 7,324,951 B2
(45) Date of Patent: Jan. 29, 2008

(54) METHOD OF PROCESSING VEHICLE DAMAGE CLAIMS

(76) Inventors: Glenn M. Renwick, 7840 Larkspur, Chagrin Falls, OH (US) 44022; Steven Gellen, 18336 Bayberry Dr., Chagrin Falls, OH (US) 44023; Brian J. Passell, 55 Chadbourne Dr., Hudson, OH (US) 44236

( * ) Notice: Subject to any disclaimer, the term of this patent is extended or adjusted under 35 U.S.C. 154(b) by 1123 days.

(21) Appl. No.: 09/874,483

(22) Filed: Jun. 5, 2001

(65) Prior Publication Data

US 2002/0188479 A1  Dec. 12, 2002

(51) Int. Cl.
    *G06Q 40/00*  (2006.01)

(52) U.S. Cl. ........................................................ 705/4

(58) Field of Classification Search ................. 705/4
    See application file for complete search history.

(56) References Cited

U.S. PATENT DOCUMENTS

| 5,432,904 | A | * | 7/1995 | Wong ............................... 705/4 |
| 5,504,674 | A |   | 4/1996 | Chen et al. .................. 364/401 |
| 5,845,254 | A |   | 12/1998 | Lockwood et al. ............ 705/2 |
| 5,950,169 | A | * | 9/1999 | Borghesi et al. ............... 705/4 |
| 6,041,310 | A |   | 3/2000 | Green et al. .................... 705/27 |
| 2002/0002475 | A1 | * | 1/2002 | Freedman et al. ............. 705/4 |
| 2002/0007289 | A1 | * | 1/2002 | Malin et al. .................... 705/4 |
| 2002/0032586 | A1 | * | 3/2002 | Joao ............................... 705/4 |
| 2002/0035488 | A1 | * | 3/2002 | Aquila et al. ................... 705/4 |
| 2002/0099575 | A1 | * | 7/2002 | Hubbard et al. ................ 705/5 |

OTHER PUBLICATIONS

Before Buying That New Car . . . Check Out High-Speed Crash Tests on progressive.com; PR Newswire. New York; Mar. 21, 2001; pp. 1-3.*
e Autoclaims.com Introduces the Next Generation in Web-Ware' Auto Claims Applications (PR Newswire. New York: Jul. 19, 2000. p. 1).*
Focus: Motor vehicle insurance: Setting claims BusinessWorld. Manila: Feb. 18, 1997. p. NOPGCIT.*

\* cited by examiner

*Primary Examiner*—Zeender Ryan Florian
*Assistant Examiner*—Vanel Frenel
(74) *Attorney, Agent, or Firm*—The Webb Law Firm

(57) ABSTRACT

The method begins with an insured operator or third party claimant reporting a vehicle damage claim to an insurance provider of the insured operator. The damaged vehicle is delivered to a facility operated by the insurance provider. The insured operator or third party claimant is provided with a rental car at the insurance provider's facility. A repair estimate is prepared at the insurer's facility by a representative of the insurance provider. A repair facility is then selected by the representative of the insurance provider. The vehicle is then picked up by the repair facility and repaired at the repair facility. The repaired vehicle is returned by the repair facility to the insurance provider's facility. The repaired vehicle is returned to the insured operator or third party claimant at the insurance provider facility. The insured operator or third party claimant also returns the rental vehicle at the insurance provider facility at the same time the repaired vehicle is picked up.

32 Claims, 3 Drawing Sheets

METHOD OF PROCESSING VEHICLE DAMAGE CLAIMS

BACKGROUND OF THE INVENTION

1. Field of the Invention

The present invention relates to a method of processing vehicle damage claims and, more particularly, relates to a method of processing vehicle damage claims from an initial claim through final settlement that requires a minimum of input, time and involvement from the insured or third party claimant (either of which may be referred to herein as the "claimant").

2. Description of the Prior Art

The vehicle damage repair process normally involves the performance of numerous tasks, many of which must be arranged and managed by, or require input from the claimant, which requires a considerable amount of time and effort on the claimant's part. The typical process employed by insurers (insurance providers) for processing vehicle damage claims requires that the claimant be personally involved in each step of the process. In the typical industry claim handling process, the claimant must (1) report the claim to the insurer; (2) make arrangements for the insurer to inspect the vehicle; (3) obtain at least one, and often several, estimates to repair the damage; (4) select a body and/or repair shop to complete the necessary repairs; (5) manage the repair outcome (including timeliness and quality of the repair); (6) obtain a rental car; and (7) pay each participant in the process. The claimant may receive an advance from or be reimbursed by the insurer for these charges. In some instances, the claimant is required to bring the damaged vehicle to the insurer's drive-in claim center for an inspection and an estimate before dropping the vehicle at the selected repair facility.

FIG. 1 is a flow chart that identifies the typical steps required in another current vehicle damage claim processing method. This claim handling process begins with the claimant reporting 10 the claim to the insurer and, more particularly, a central handling branch of the insurer. The handling branch thereafter attempts to dispatch 20 a field representative to the vehicle. The field representative inspects the vehicle and prepares 30 a field estimate. The field representative then issues 40 a field draft for the estimate amount to the claimant. The field representative may also coordinate 50 with the central handling branch to address rental vehicle billing for the claimant.

The insurer now must wait for the claimant to perform certain actions. First, the claimant must select 60 a repair facility and deliver 70 the vehicle to the repair facility. Experience has shown that the vehicle often arrives at the repair facility two or more weeks after the accident date. The claimant must also identify 80 a rental vehicle vendor and arrange for a rental vehicle for the period the vehicle is in the repair facility. The rental vendor must confirm 90 with the insurance company that the claimant has appropriate rental vehicle coverage. The foregoing steps performed by the claimant are time consuming and inconvenient.

Upon delivery of the vehicle to the repair facility, the repair facility inspects 100 the vehicle and reviews the initial estimate written by the field representative. The repair facility reviews 110 the initial estimate for accuracy. Typically, the repair facility informs 120 the claimant that the estimate is inadequate. This first or field estimate is often inaccurate because the field representative does not have the means to identify hidden damage. Furthermore, field representatives frequently do not possess the necessary experience, training or equipment to evaluate every aspect of potential damage.

The repair facility may then ask the claimant to coordinate with the insurance company to deal with the repair facility's concerns. Alternatively, the repair facility often states that it will deal directly with the insurer, but this leaves the claimant wondering whether the insurance company will in fact deal with the repair facility on the inadequate estimate and do so in a timely manner. In either case, the insurer must dispatch 130 a field representative to the repair facility to identify the deficiencies of the field estimate, confirm the need for additional repairs, if necessary, and issue 140 a supplemental draft for the difference. Only at this point will the repair facility actually begin repair work 150 on the vehicle. Further, it is not uncommon for the repair facility to ask for numerous supplemental drafts during the repair process as hidden damage is found. Experience has shown that on average about 1.25 to 1.5 supplements occur after the initial estimate is written. Moreover, subsequent to dropping off the damaged vehicle at the repair facility, the claimant must procure a rental vehicle.

In the meantime, the claimant will typically place numerous phone calls to the insurance company asking about the supplements, status of repairs, rental vehicle extensions, etc. When the vehicle is finally repaired, the claimant must arrange 160 to drop off the rental vehicle and pick up the repaired vehicle. On average, repairs take an additional two weeks. Further, the claimant must deal with the repair facility on any repair quality issues.

As shown in FIG. 1, the claimant must devote considerable time and effort in the processing of vehicle damage claims according to the currently known systems. At a minimum, the claimant often is without his/her vehicle, or is driving a damaged vehicle pending an opening at the repair facility, for an entire month according to the presently known systems. Clearly, there is a need to provide a better and more efficient system that (a) requires less involvement, time, energy and input from the claimant in the processing of vehicle damage claims, (b) provides better coordination between the insurer, repair facility and rental car company, (c) provides more accuracy in the estimating process, and (d) reduces the cycle time of the entire process.

Certain attempts have been made in the prior art to automate the current method of processing vehicle damage claims illustrated in FIG. 1. For example, U.S. Pat. No. 5,950,169 to Borghesi et al. discloses a system and method for managing insurance claims that includes a computer network that controls the electronic transmission of files between various computers. The computers may be located at part supply vendors, repair shops, salvage yards, insurance company offices, and other terminals that may be used in an insurance claim processing application. When a claim is filed, the claim is entered as a work file in the system. The different computers of the network may access the work file to enter certain information into the work file, which is then accessible by all the computers of the network. For example, a repair shop may enter into the work file cost estimates for parts and labor costs for repairing a particular vehicle. The work file will also contain vehicle information describing the vehicle, identification number, year, make, model, and other pertinent information about the vehicle. Certain calculations may be conducted on the work file including whether the present worth of the vehicle based on estimates such as blue book evaluations suggest that the vehicle should be declared a total loss.

Even though the automated system by the Borghesi et al. patent attempts to streamline the currently known system for processing vehicle damage claims, the claimant must still perform each of the time consuming tasks discussed previously and arrange and manage each step in the vehicle repair process. For example, the claimant must secure one or more estimates, select the repair shop, identify a rental vendor and arrange for a rental vehicle, deliver the vehicle to the repair shop, pick up the rental vehicle, coordinate with the repair shop throughout the repair process, pick up the repaired vehicle, return the rental vehicle, inspect the repairs for deficiencies, and negotiate with the repair shop to correct deficiencies. Accordingly, the system and method for managing insurance claim processing disclosed by the Borghesi et al. patent saves little time and effort on the behalf of the insured or third party claimant.

Other prior art in this area includes U.S. Pat. No. 5,504,674 to Chen et al. directed to an insurance claim estimate, text, and graphics network for processing insurance claims, and U.S. Pat. No. 5,432,904 to Wong directed to an auto repair estimate, text, and graphic system. However, the automated computer network systems disclosed by these references suffer from the same disadvantages discussed hereinabove in connection with the Borghesi et al. patent. The claimant must expend significant time and effort in managing the insurance claim process with multiple inputs required by the claimant before the vehicle is finally repaired and returned to his/her possession.

In view of the foregoing, it is an object of the present invention to restructure and simplify the currently known methods of processing vehicle damage claims. In addition, it is an object of the present invention to minimize the inputs required by the claimant during the processing of a vehicle damage claim and to make the entire process less burdensome for the claimant. Further, it is an object of the present invention to more efficiently handle the processing of vehicle damage claims.

SUMMARY OF THE INVENTION

The above objects are accomplished with a method of processing vehicle damage claims in accordance with the present invention. The present invention provides a method for processing vehicle damage claims for use by insurers. The method begins with a claimant (insured operator or third party claimant) reporting a vehicle damage claim to his or her own insurer or an insurer of the insured operator. The damaged vehicle is delivered to a facility operated by or associated with the insurer. A rental vehicle may be pre-arranged by the insurer and picked up by the claimant at the insurer's facility at the same time the damaged vehicle is dropped off. Alternatively, the insurer can drop the rental vehicle off at the claimant's residence (or other location) and pick up the damaged vehicle. A repair estimate is prepared at the insurer's facility by a representative of the insurer. A repair facility is then selected by the representative of the insurer from a number of pre-qualified repair facilities. The vehicle is then repaired at the selected repair facility and returned to the insurer's facility. The insurer inspects the repaired vehicle to confirm that the required repairs have been properly completed. The repaired vehicle is then returned to the claimant, who drops off the rental vehicle at the insurer's facility where he/she picks up the repaired vehicle. Alternatively, the insurer can deliver the repaired vehicle to the claimant at the claimant's residence or other agreed-upon location, and pick up the rental vehicle. The entire process is arranged, coordinated and managed by the insurer.

The method may include the steps of verifying insurance coverage of the insured after the step of reporting the vehicle damage claim to the insurer and scheduling with the claimant to deliver the vehicle to the insurer's facility. If the vehicle is not driveable, the method may include the step of towing the vehicle to the insurer's facility or directly to the repair facility.

The repair estimate prepared at the insurer's facility by the representative of the insurance provider preferably includes at least partial dismantling of the vehicle for accurately assessing vehicle damage. The repair facility selection step of the present invention may be based on repair facility capacity and the nature and scope of vehicle repairs required. Once the repair facility is selected, the representative of the insurer may settle on an agreed price of vehicle repair with the repair facility.

The method of the present invention may further include the steps of the repair facility picking up the vehicle at the insurer's facility, the insurer providing repair status updates to the claimant, and the insurer evaluating repair quality of the vehicle at the insurer's facility. The step of returning the repaired vehicle to the claimant preferably occurs at the insurer's facility.

In another aspect of the present invention, the method of processing vehicle damage claims further includes the step of soliciting repair bids from multiple repair facilities. These repair facilities are preferably pre-qualified by the insurer based on numerous criteria, including, without limitation, level of experience, shop capabilities (including equipment on site and trained automotive technicians), availability and use of technology, prior performance, commitment to quality and continuous training of personnel, professional certifications and quality assurance programs. The method according to the present invention may further include the step of electronically posting images of the vehicle and description of the vehicle repairs required for viewing by the bidding repair facilities. Accordingly, the bidding repair facilities may prepare bids based on full knowledge of the vehicle damage.

Further details and advantages of the present invention will become apparent from the following detailed description read in conjunction with the drawings.

DETAILED DESCRIPTION OF PREFERRED EMBODIMENTS

Figure 2:
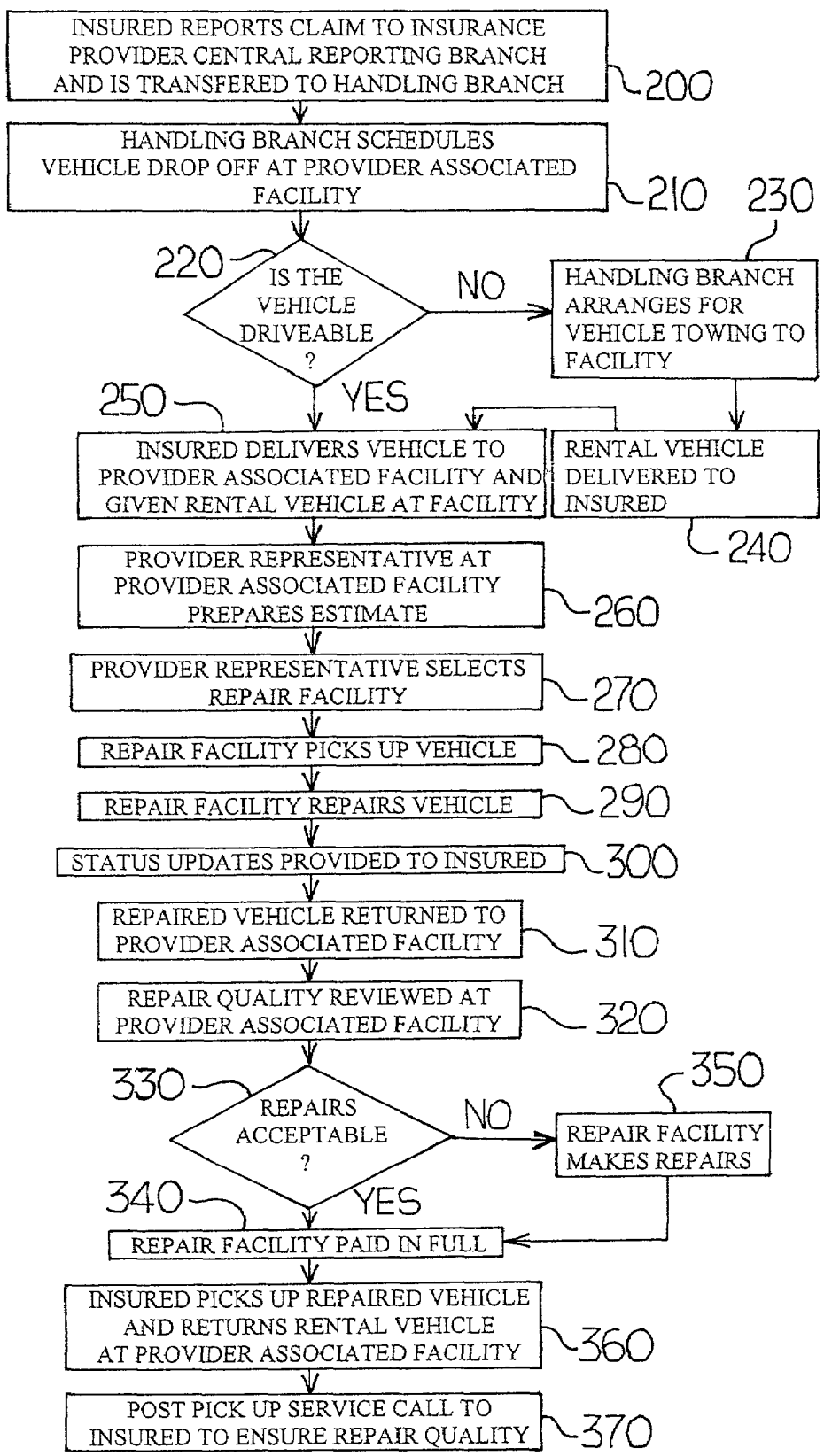
FIG. 2 is a flow chart of a method of processing vehicle damage claims in accordance with the present invention.

FIG. 2 is a flow chart identifying the method steps for processing vehicle damage claims in accordance with the present invention. After damage occurs to a claimant's vehicle, the claimant reports 200 a vehicle damage claim to an insurance provider in a conventional manner. For example, the claimant may report the claim to a central reporting branch by calling an "800" number. The central reporting branch may transfer 200 the claimant and claim to a designated handling branch. The central reporting branch or designated handling branch will initially verify insurance coverage of the insured in, for example, an internal insurer database. The central reporting branch or the designated handling branch thereafter schedules 210 a vehicle drop off at a facility operated by the insurer or an insurer-associated facility. The insurer's facility may be owned or leased. In another embodiment, the repair facility can be contracted by the insurance provider to act as its representative.

The central reporting branch or the designated handling facility then determines 220 whether the vehicle is driveable. If it is determined that the vehicle is not driveable, the central reporting branch or designated handling branch arranges 230 for towing of the vehicle to the insurer's facility or a selected repair facility and arranges for delivery 240 of a rental vehicle to the claimant. If the vehicle is driveable, the claimant delivers 250 the vehicle to the insurer's facility. The central reporting branch or designated handling branch further coordinates to have a rental vehicle waiting for the claimant 250 at the insurer's facility. The claimant picks up the rental vehicle at the insurer's facility when he/she drops off the damaged vehicle.

A repair estimate is then prepared 260 by the insurer at its facility or at a selected repair facility. The repair estimate is preferably prepared by a representative of the insurer, or it may be prepared by an agent acting under the supervision of the insurer representative at the insurer's facility. The estimate may indicate the estimated number of hours to complete the repair and/or the estimated cost of the repairs. Alternatively, the estimate may only describe the area(s) of damage and prescribe the repair operation and part choices. In order to ensure that the repair estimate is accurate, partial tear down of the vehicle may be performed to fully assess the vehicle damage. The insurer representative (or the agent acting under the supervision of the insurer representative) prepares the repair estimate, which is typically accomplished within twenty-four hours of delivery of the vehicle to the insurer's facility. With an accurate repair estimate prepared, the insurer selects 270 a suitable repair facility from the pre-qualified repair facilities. The repair facility is selected based on such factors as the ability to begin the repair immediately, cycle time to complete the repairs, experience, equipment, properly trained personnel and repair cost. Other factors, such as prior history of quality repairs and expertise with a specific type of vehicle or type of damage, may. also be used as selection criteria.

The selected repair facility and the insurer settle on an agreed price of repairs for the vehicle. Upon agreement on price for the vehicle repair, the repair facility picks up 280 the vehicle at the insurer's facility. The repair facility then takes the vehicle to its repair shop and repairs 290 the vehicle. The insurer makes periodic repair status checks with the repair facility. This can be done electronically, by telephone or in person. The insurer representative provides 300 periodic repair status updates to the claimant. Such updates may include telephone calls, electronic posting of the vehicle repair status on the insurer's website, electronic mail updates to the claimant, and the like. Upon completion of the vehicle repairs, the repair facility returns 310 the repaired vehicle to the insurer's facility. Alternatively, the insurer can deliver and pick-up the vehicle at the repair facility.

The quality of the vehicle repairs is then reviewed by the insurer 320 at its facility to determine 330 whether the necessary repairs have been completed and are acceptable. If the vehicle repairs are acceptable, the repair facility is paid 340 in full. If the repairs are not acceptable, the repair facility takes the vehicle back to its repair shop to eliminate 350 the deficiencies/discrepancies. The repair facility then returns the repaired vehicle to the insurer's facility for another evaluation of the vehicle repairs. Once the vehicle repairs are acceptable, the repair facility is then paid 340 in full.

The claimant is then contacted (via telephone call, page, beeper, mail, e-mail, etc.) and is made aware that the vehicle is ready for pickup. The claimant picks up 360 the repaired vehicle at the insurer's facility and returns the rental vehicle at the insurer's facility in one step. The insurer then returns the rental vehicle to the rental provider. Other actions may take place at the point where the claimant picks up the repaired vehicle. The claimant may be given warranties for the repairs to the vehicle from both the repair facility and the insurer, and may be required to pay the insurance deductible and other charges not covered by the insurance policy of the insured. A final post-delivery service contact 370 may be provided to the claimant to ensure repair quality and the claimant's satisfaction with the repairs and the actions of the insurer at the insurer's facility. The foregoing described method significantly decreases the time investment and involvement of the claimant, in the process of managing vehicle damage claims over the method discussed previously in connection with FIG. 1, reduces repair time and the number of supplemental inspections and estimates, and improves the quality of the damage estimates and the repairs.

The method of the present invention eliminates the problems of the prior art systems described above which are experienced due to field estimates which are performed by inexperienced field representatives who are not properly equipped to locate hidden damage. In the present invention, the estimate is made in a controlled environment in which the appropriate diagnostic equipment can be utilized and the specialized experience of multiple claims professionals can be applied to evaluate different aspects of the damage. This process thus increases the accuracy of the estimate and reduces the need for multiple supplements. Moreover, the process of pre-selecting and qualifying repair shops ensures that a damaged vehicle will be assigned to an appropriate facility, in terms of training, experience, equipment and timeliness, to properly complete the repairs. The insurer's review of the repair facility's work, coupled with the insurer's warranty of the repair work, helps to ensure customer satisfaction and the quality of the repairs.

Furthermore, in the method of the present invention, the insurer manages the entire repair process and all interfaces with the claimant, repair facility and rental car company. The claimant no longer deals directly with the repair facility or the rental car company. Instead, he or she will deal solely with one party (i.e. the insurer) with respect to all aspects of the vehicle repair process. This system improves quality, reduces cycle time and simplifies the vehicle damage process from the perspective of the claimant. The process, therefore, is highly convenient for the insured or other claimant, who is relieved of the necessity to be directly involved in and manage each of the many aspects of the vehicle repair process.

Preferably, the repair shops which participate in this claimed process will be pre-qualified by the insurer. In selecting shops for participation in the program, a number of criteria can be applied. These include, for example: minimum business experience; the willingness to provide a lifetime warranty for the repair work; whether the shop offers pick-up and delivery of the vehicles; secure storage;

a satisfactory training program; all necessary business licenses and adequate proof of insurance; quality work; professional certifications; and the experience and equipment necessary to provide certain repairs.

The present invention also offers substantial efficiencies by streamlining the payment process. In the typical claims handling process, the claimant writes multiple checks, paying each body shop and the rental company separately, while the insurer either reimburses or advances funds to the claimant. Each vendor assumes the risk of collecting sums due from the claimant. Under the method of the present invention, the insurer pays the repair shops and rental car company in full and collects the deductible amount from the insured. The insured, therefore, writes only one check to the insurer, who disburses the required payments to the repair shops and vehicle rental company.

Figure 1:
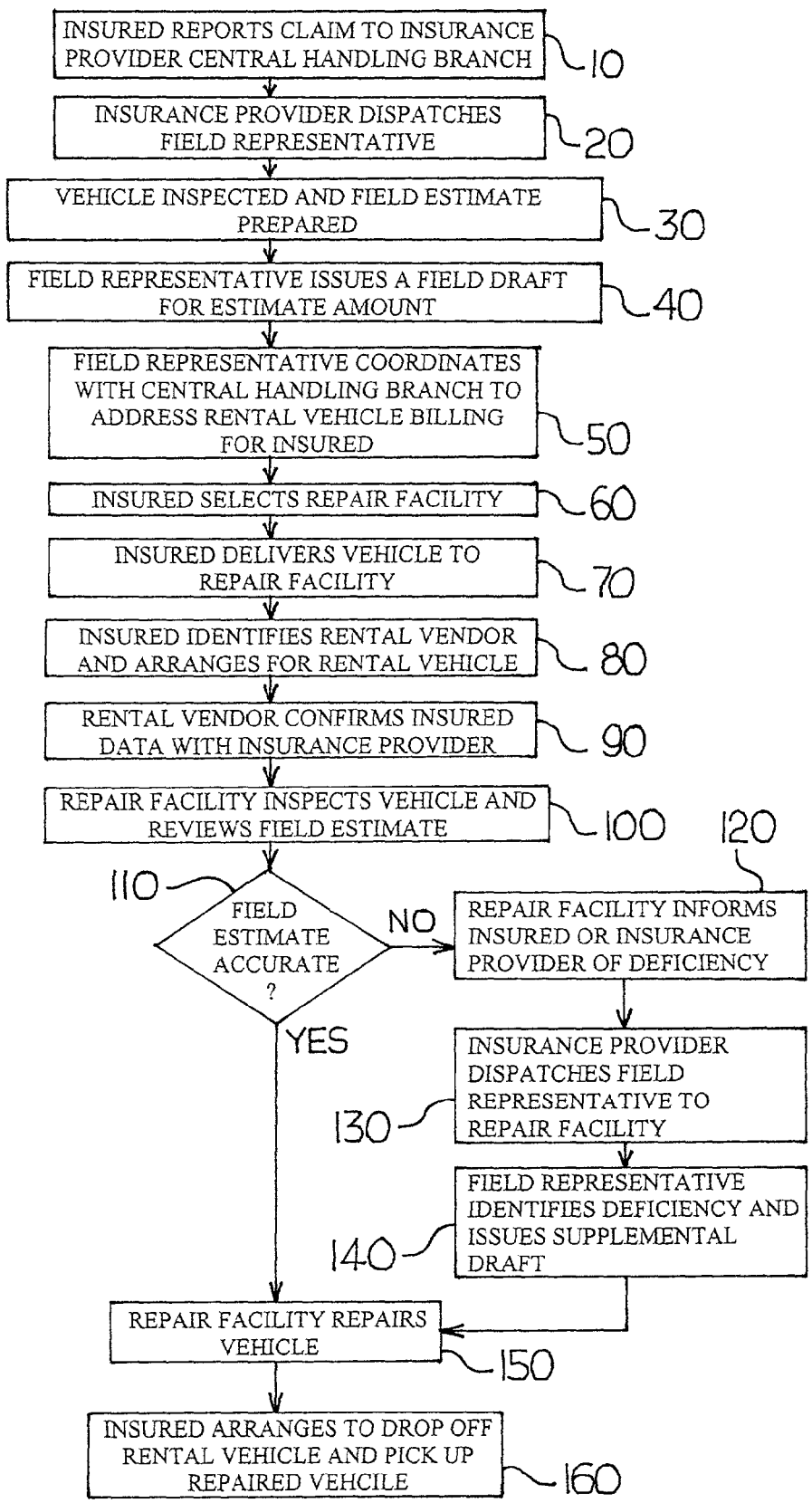
FIG. 1 is a flow chart of a prior art method of processing vehicle damage claims.

The following table identifies estimated time expenditures for the method of FIG. 1, discussed previously, and the method of the present invention according to FIG. 2, and the time savings the present invention affords over the prior art:

| Method of FIG. 1 | | Method of FIG. 2 | |
|---|---|---|---|
| oInsured Time Involved: | 6 hrs | Insured Time Involved: | 2 hrs |
| Insurance Provider Time: | 3 hrs | Insurance Provider Time: | 2.5 hrs |
| Repair Facility Time Involved: | 2 hrs | Repair Facility Time Involved: | 1 hr |
| Rental Provider Time Involved: | 1 hr | Rental Provider Time Involved: | .5 hrs |
| TOTAL | 12 hrs | TOTAL | 6 hrs |

Figure 3:
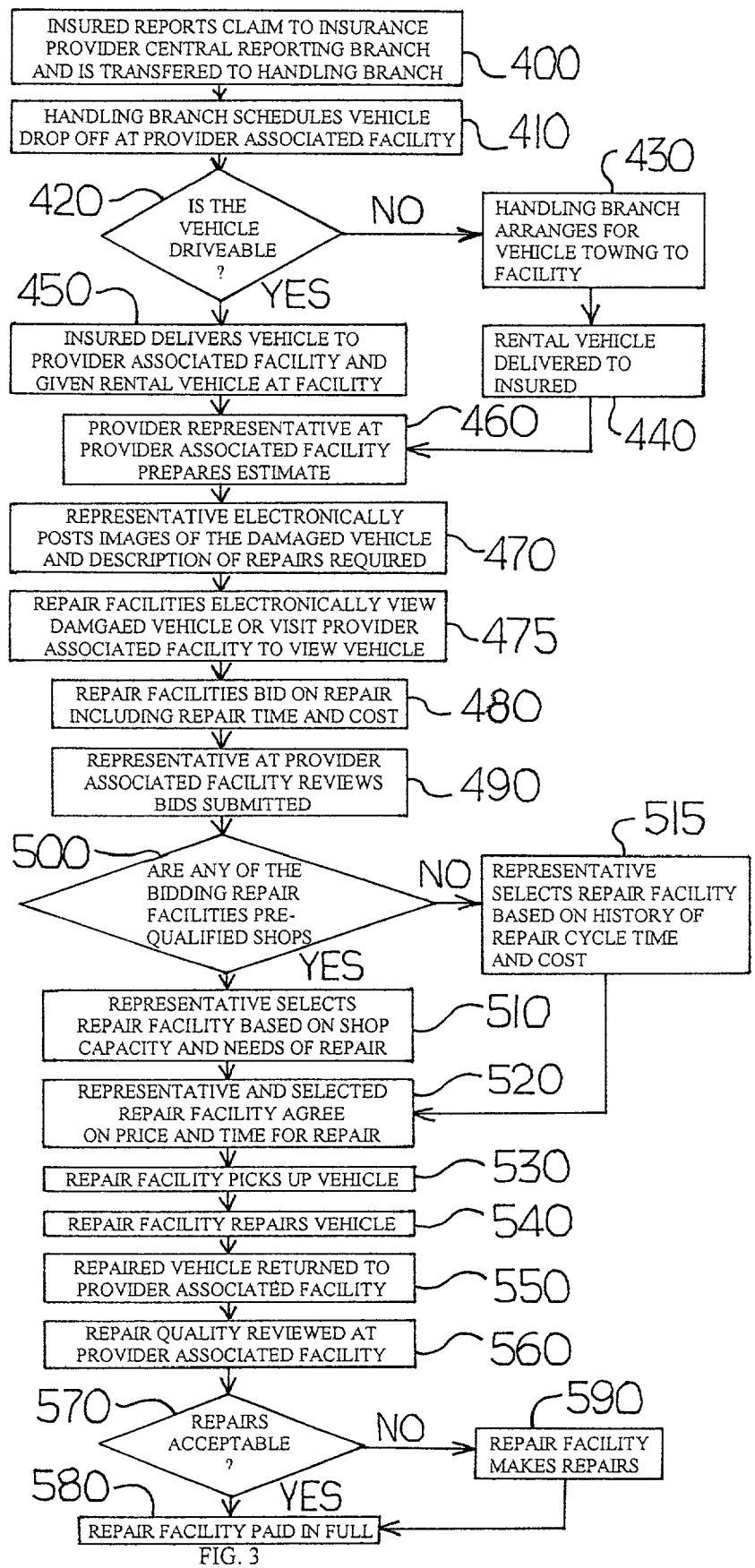
FIG. 3 is a flow chart of a second embodiment of the method of processing vehicle damage claims in accordance with the present invention and including additional steps for selecting a repair facility.

FIG. 3 is a flow chart identifying the method steps for processing vehicle damage claims in accordance with a second embodiment of the present invention. The method illustrated in FIG. 3 is substantially similar to the method discussed hereinabove in connection with FIG. 2, but includes additional steps for selecting the repair facility. Referring to FIG. 3, the claimant again reports 400 a vehicle damage claim to an insurer at a central reporting branch. The central reporting branch may transfer 400 the claimant and the claim information to a designated handling branch. The central reporting branch or designated handling branch schedules 410 to have the claimant drop off the vehicle at the insurer's facility. The insurer also could pick-up the damaged vehicle at the claimant's residence or other location.

The central reporting branch or the designated handling branch must also determine 420 whether the vehicle is driveable. If the vehicle is not driveable, the central reporting branch or the designated handling branch arranges 430 for the vehicle to be towed to the insurer's facility or directly to the repair facility. Additionally, the central reporting branch or the designated handling branch arranges 440 for delivery of a rental vehicle to the claimant. If the vehicle is driveable, the claimant delivers 450 the damaged vehicle to the insurer's facility and is given 450 a rental vehicle at the insurer's facility. Alternatively, the rental vehicle could be delivered to, and the damaged vehicle picked up from, the claimant at his/her residence or other location. The insurer's facility may also be tasked with providing the rental vehicle to the claimant if the central reporting branch or the designated handling branch does not accomplish this task.

The insurance provider representative at the insurer's facility prepares 460 a vehicle repair estimate for the damage. The steps of the method of processing vehicle damage claims identified in FIG. 3 are, to this point, equivalent to the steps identified in FIG. 2. Upon preparation of a vehicle repair estimate, the insurance provider representative preferably will electronically post 470 images (i.e., photographs) of the damaged vehicle and description of vehicle repairs required on a computer network accessible by pre-qualified repair facilities. The repair facilities may then electronically view 475 the damaged vehicle. Preferably, the insurance provider representative at the insurer's facility will have access at the facility to the insurance provider's computer network, which will be accessible by the pre-qualified repair facilities.

The insurance provider representative may solicit 480 repair bids from the pre-qualified repair facilities that view the electronic images of the damaged vehicle and description of vehicle repairs required. Other information, such as when the repairs can be completed and the expected completion date, may also be requested. In addition, the repair facilities may visit the damaged vehicle at the insurer's facility to review the vehicle damage in person.

The insurance provider representative at the insurer's facility receives and reviews 490 the repair bids submitted by the repair facilities. The insurance provider representative at the insurer's facility preferably selects a repair facility within twenty-four hours of posting the electronic images and description of vehicle repairs required. The selected repair facility is preferably selected on the basis of repair capabilities, ability to commence repairs immediately, repair cycle time and repair costs. The present invention envisions that repair facilities be identified in advance as pre-qualified.

The insurance provider representative selects 510 among the pre-qualified facilities based on known shop capacity of the pre-qualified facilities and specific requirements relating to the vehicle repair, as well as the other criteria described above.

Upon selection of the repair facility, the insurance provider representative and the selected repair facility agree 520 on repair price and time for repair of the vehicle. The remaining steps set forth in FIG. 3 are substantially identical to the steps of the method according to FIG. 2. The selected repair facility then picks 530 up the vehicle and repairs 540 the vehicle. The insurance provider representative at the insurer's facility provides periodic repair status updates to the claimant. Upon completion of the necessary repairs, the repair facility returns 550 the vehicle to the insurer's facility, which is then reviewed by the insurance provider representative. The insurance provider representative reviews 560 the quality of the repair at the insurer's facility to determine 570 whether the required repairs have been completed and are acceptable. If the repairs have been completed and are acceptable, the repair facility is paid 580 in full. If the repairs are not acceptable, the repair facility returns the vehicle to the repair shop and makes 590 further repairs. The claimant then picks up the repaired vehicle and returns the rental vehicle in one step at the insurer's facility. Alternatively, the insurer can deliver the repaired vehicle at the claimant's residence and pick-up the rental vehicle. The claimant may be given a warranty for the repairs from both the repair facility and the insurer. Further, the insured may be required to pay an insurance deductible or other charges not covered by the insurance policy. A post pickup service call is made to the claimant by the insurance provider representative to ensure that the repair quality and repair process is satisfactory.

In a further embodiment of the present invention, the method may be utilized to obtain vehicle service or repairs by an individual who is not a claimant under an insurance policy. In this embodiment, the non-claimant ("customer"), may utilize the methods described herein to have his/her vehicle serviced or repaired by paying the insurer to coordinate and facilitate the repair/rental process. In such embodiment, the insurer facility can be replaced by a "coordination entity" that can be an entity other than an insurer. The methods described above would be performed by the coordination entity at a coordination facility for a customer, instead of by an insurance provider at an insurer facility for a claimant. In a further embodiment, the repairs to the damaged customer vehicle can be performed by the coordination entity at the coordination facility.

The methods described hereinabove for processing vehicle damage claims minimize the involvement and time input required by the claimant during the vehicle repair process. The inputs of the claimant are limited to, for example, the delivery and pickup of the damaged vehicle and rental vehicle at the insurer's facility. The insurer manages the repair facility and repair process, and procurement of the rental vehicle, thereby eliminating the need for the claimant to interact with the repair facility and the rental vehicle vendor. The insurance provider representative, because he or she is working at a centralized facility, is also able to make repair estimates in a controlled environment. The insurance provider representative may make partial vehicle teardowns to assess the extent of damage and locate hidden damage. The insurance provider representative may then prepare a detailed description of the vehicle damage in a controlled environment. The extent of the vehicle damage may be photographed and posted electronically for viewing by repair facilities. A pre-qualified network of repair facilities may be identified in advance to expedite the processing of the vehicle damage claims in accordance with the present invention. The methods described hereinabove result in significant time savings on behalf of the claimant, the insurance provider representative, and the insurance provider, and helps to ensure the accuracy of damage/repair estimates and the quality of repairs. These methods further reduce cycle time and the need for multiple supplements.

While preferred embodiments of the present invention were described herein, various modifications and alterations of the present invention may be made without departing from the spirit and scope of the present invention. The scope of the present invention is defined in the appended claims and equivalence thereto.

We claim:

1. A method of processing vehicle damage claims, comprising the steps of:
   reporting a vehicle damage claim to an insurance provider by a claimant:
   delivering a damaged claimant vehicle to an insurer facility operate provider;
   preparing a repair estimate at the insurer facility by a representative of the insurance provider;
   selecting a repair facility, with the repair facility selected by the insurance provider without input from the claimant;
   repairing the damaged claimant vehicle at the repair facility;
   returning the repaired claimant vehicle to the insurer facility without input from the claimant; and
   returning the repaired claimant vehicle to the claimant.

2. The method of claim 1, further comprising the step of verifying insurance coverage after the step of reporting the vehicle damage claim to the insurance provider by the claimant.

3. The method of claim 1, further comprising the step of scheduling with the claimant to deliver the damaged claimant vehicle to the insurer facility.

4. The method of claim 3, wherein if the damaged claimant vehicle is not driveable the method further comprising the step of towing the damaged claimant vehicle to the insurer facility.

5. The method of claim 1, further comprising the step of the insurance provider providing a rental vehicle to the claimant at the insurer facility.

6. The method of claim 1, further comprising the step of the insurance provider delivering a rental vehicle to the claimant and picking up the damaged vehicle at a location selected by the claimant.

7. The method of claim 1, wherein the step of preparing the repair estimate at the insurer facility by the representative of the insurance provider includes at least partial dismantling of the damaged claimant vehicle for accurately assessing vehicle damage.

8. The method of claim 1, wherein the repair facility selection step is based on one or more of repair facility capacity, experience, equipment, personnel, past performance, ability to begin repairs promptly, repair cycle time and scope of vehicle repairs required.

9. The method of claim 1, further comprising the step of the representative of the insurance provider at the insurer facility settling on an agreed price of vehicle repair with the repair facility.

10. The method of claim 1, further comprising the step of the repair facility picking up the damaged claimant vehicle at the insurer facility, and returning the claimant vehicle to the insurer facility following completion of required repairs.

11. The method of claim 1, further comprising the step of providing repair status updates to the claimant by the insurance provider.

12. The method of claim 1, further comprising the step of the insurance provider inspecting and evaluating repair quality of the claimant vehicle at the insurer facility after the step of repairing the claimant vehicle at the repair facility.

13. The method of claim 1, wherein the step of returning the repaired claimant vehicle to the claimant occurs at the insurer facility.

14. The method of claim 1, wherein the claimant drops off the rental vehicle and picks up the repaired claimant vehicle at the insurer facility.

15. A method of processing vehicle damage claims, comprising the steps of:
    reporting a vehicle damage claim to an insurance provider by a claimant;
    delivering a damaged claimant vehicle to an insurer facility operate insurance provider;
    preparing a repair estimate at the insurer facility by a representative of the insurance provider;
    soliciting repair bids from repair facilities;
    selecting a repair facility, with the repair facility selected by the representative of the insurance provider at the insurer facility without input from the claimant;

repairing the damaged claimant vehicle at the repair facility;

returning the claimant vehicle to the insurer facility without input from the claimant; and returning the repaired claimant vehicle to the claimant.

16. The method of claim 15, further comprising the step of verifying insurance coverage after the step of reporting the vehicle damage claim to the insurance provider by the claimant.

17. The method of claim 15, further comprising the step of scheduling with the claimant to deliver the damaged claimant vehicle to the insurers facility.

18. The method of claim 15, further comprising the step of providing a rental vehicle to the claimant at the insurer facility.

19. The method of claim 15, further comprising the step of the insurance provider delivering a rental vehicle to the claimant and picking up the damaged claimant vehicle at a location selected by the claimant.

20. The method of claim 15, wherein the step of preparing the repair estimate at the insurer facility by the representative of the insurance provider includes at least partial dismantling of the damaged claimant vehicle for accurately assessing vehicle damage.

21. The method of claim 15, further comprising the step of the representative of the insurance provider at the insurer facility settling on an agreed price of vehicle repair with the repair facility.

22. The method of claim 15, further comprising the step of the repair facility picking up the damaged claimant vehicle at the insurer facility, and returning the claimant vehicle to the insurer facility following completion of the required repairs.

23. The method of claim 15, further comprising the step of providing repair status updates to the claimant by the insurance provider.

24. The method of claim 15, further comprising the step of evaluating repair quality of the claimant vehicle at the insurer facility after the step of repairing the claimant vehicle at the repair facility.

25. The method of claim 18, wherein the step of returning the repaired vehicle to the claimant occurs at the insurer facility, and the claimant returns the rental vehicle to the insurer facility.

26. A method of processing vehicle damage claims, comprising the steps of:

reporting a vehicle damage claim to an insurance provider by a claimant;

delivering a damaged claimant vehicle to an insurer facility;

providing a rental vehicle to the claimant at the insurer facility;

preparing a repair estimate at the insurer facility by a representative of the insurance provider;

electronically posting images of the damaged claimant vehicle and description of vehicle repairs required and soliciting repair bids from repair facilities where the posting is performed by the insurance provider;

selecting a repair facility, with the repair facility selected by the insurance provider without input from the claimant;

repairing the damaged claimant vehicle at the repair facility;

returning the repaired claimant vehicle to the insurer facility without input from the claimant;

evaluating repair quality of the claimant vehicle at the insurer facility; and returning the repaired claimant vehicle to the claimant at the insurer facility.

27. The method of claim 26, further comprising the step of verifying insurance coverage after the step of reporting the vehicle damage claim to the insurance provider by the claimant.

28. The method of claim 26, wherein the step of preparing the repair estimate at the insurer facility by the representative of the insurance provider includes at least partial dismantling of the damaged claimant vehicle for accurately assessing vehicle damage.

29. The method of claim 26, further comprising the step of the representative of the insurance provider at the insurer facility settling on an agreed price of vehicle repair with the repair facility.

30. The method of claim 26, further comprising the step of the repair facility picking up the damaged claimant vehicle at the insurer facility, and returning the claimant vehicle to the insurer facility following completion of the required repairs.

31. The method of claim 26, further comprising the step of the claimant returning the rental vehicle at the insurer facility.

32. A method of processing vehicle damage claims, comprising the steps of:

reporting a vehicle damage claim to a coordination entity by a customer;

delivering a damaged customer vehicle to a coordination facility;

providing a rental vehicle to the customer at the coordination facility;

preparing a repair estimate at the coordination facility by the coordination entity;

selecting a repair facility, with the repair facility selected by the coordination entity without input from the customer;

repairing the damaged customer vehicle at the repair facility;

returning the repaired customer vehicle to the coordination facility without input from the customer;

returning the repaired customer vehicle to the customer at the coordination facility; and returning the rental vehicle by the customer at the customer at the coordination facility.

* * * * *

UNITED STATES PATENT AND TRADEMARK OFFICE
CERTIFICATE OF CORRECTION

PATENT NO. : 7,324,951 B2  Page 1 of 1
APPLICATION NO. : 09/874483
DATED : January 29, 2008
INVENTOR(S) : Renwick et al.

It is certified that error appears in the above-identified patent and that said Letters Patent is hereby corrected as shown below:

Column 9, Line 62, Claim 1, "operate provider" should read -- operated by the insurance provider --

Column 10, Line 61, Claim 15, "operate insurance provider" should read -- operated by the insurance provider --

Column 12, Lines 55-56, Claim 32, delete [[at the customer]]

Signed and Sealed this

Twenty-ninth Day of July, 2008

JON W. DUDAS
*Director of the United States Patent and Trademark Office*